Sept. 30, 1958                C. H. DOXTATOR                2,854,247
                        WEIGHT ATTACHMENT FOR VEHICLES
                              Filed March 7, 1955
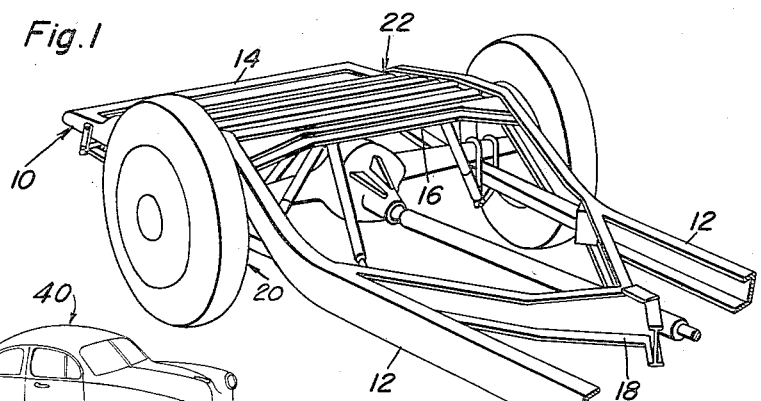
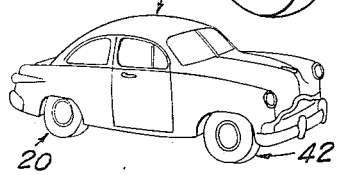
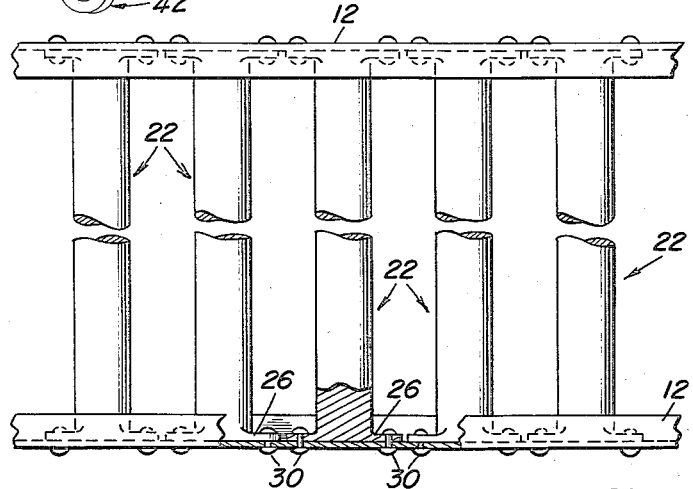
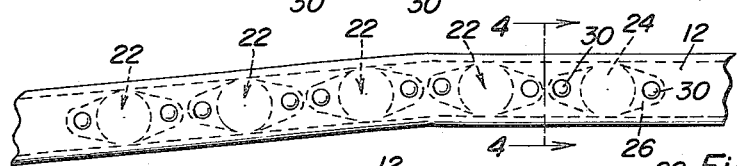
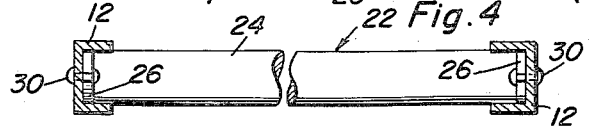
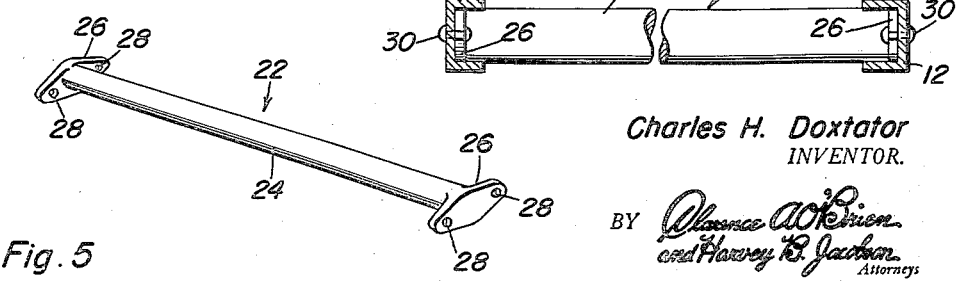
Charles H. Doxtator
INVENTOR.

United States Patent Office 2,854,247
Patented Sept. 30, 1958

2,854,247

WEIGHT ATTACHMENT FOR VEHICLES

Charles H. Doxtator, Detroit, Mich.

Application March 7, 1955, Serial No. 492,355

1 Claim. (Cl. 280—106)

This invention relates in general to new and useful improvements in attachments for vehicles, and more specifically a weight attachment for vehicles for effecting the balancing of vehicles.

In order to attain effective control of a vehicle, the weight thereof must be relatively equally distributed on all four wheels. However, the recent designs of automobiles has been such that a majority of the weight is placed on the front wheels. This is due particularly to the amount of overhang in the front, including the positioning of a major portion of the engine forwardly of the front axle line.

It is therefore the primary object of this invention to provide a suitable attachment for a vehicle which when mounted on a vehicle can so balance the weight of the vehicle so that equal weights are applied to the front and rear wheels.

Another object of this invention is to provide a weight attachment for vehicles, the weight attachment being of such a nature whereby it may be easily positioned between frame rails of frames of existing vehicles and readily secured thereto so as to readily increase the weight of the vehicle at the rear thereof, thereby placing equal weight upon the front and rear wheels.

A further object of this invention is to provide a balancing weight assembly for a vehicle which is formed of a plurality of individual weight bars having suitable mounting flanges at opposite ends thereof for reception in and securement to frame rails of a vehicle frame, the bars being separately mounted in order that the added weight to a vehicle may be varied as desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a rear portion of a vehicle chassis and shows the frame thereof having mounted between the frame rails adjacent the rear axle a plurality of vehicle balancing weights which are the subject of this invention;

Figure 2 is an enlarged fragmentary top plan view of the rear portion of the vehicle frame with the rear axle assembly being omitted and intermediate portions of the balancing weights being broken away, a portion of one of the frame rails also being broken away in order to show the connection between one of the balancing weights and the frame rail;

Figure 3 is an enlarged side elevational view of that portion of the vehicle frame illustrated in Figure 2;

Figure 4 is a transverse horizontal sectional view taken substantially upon the plane indicated by the section line 4—4 of Figure 3 and shows the relationship between ends of the balancing weights and the frame rails, an intermediate portion of the bars of the balancing weights being broken away;

Figure 5 is an enlarged perspective view of one of the balancing weights; and

Figure 6 is a perspective view on a reduced scale showing a vehicle of the general type in which the present invention is incorporated.

Referring first to Figure 6 of the drawings, there is illustrated a typical type of vehicle employing the present invention. The vehicle is referred to in general by the reference numeral 40 and includes a conventional front wheel assembly 42 and a conventional rear wheel assembly 20. The vehicle 40, in its originally designed condition, has a major portion of its weight distributed to the front wheel assembly 42.

Referring now to Figure 1 in particular, it will be seen that there is illustrated a rear portion of a frame of the vehicle 40 which frame is referred to in general by reference numeral 10. The frame 10 includes a pair of frame rails 12 which may have the free ends thereof connected together by a rear transverse frame member 14. An intermediate rear transverse frame member 16 also extends between the frame rails 12 which have forward portions thereof connected by suitable X-bracing 18. Mounted with respect to the frame 12 is the rear wheel assembly 20. The frame rails 12 are upwardly bowed rearwardly of the X-bracing 18 to provide clearance for the rear wheel assembly 20.

In order to increase the weight applied to the rear wheels of the vehicle 40, there is disposed between the frame rails 12 in the vicinity of the rear wheel assembly 20 a plurality of vehicle balancing weights which are referred to in general by the reference numeral 22. As is best illustrated in Figure 5, each vehicle balancing weight 22 includes a central bar 24 which is formed of a relatively heavy material, such as cast iron or steel, so as to be very heavy. The ends of the bars 24 are provided with mounting flanges 26 having suitable holes 28 formed therein.

When it is desired to weight a frame, such as the frame 10, the balancing weights 22 are slipped in between the frame rails 12 of such frame, as is best illustrated in Figures 2, 3 and 4, the upwardly bowed portions of the frame rails 12 being illustrated as being channel-shaped although the design of the frame 10 may vary. The balancing weights 22 are then adjusted with respect to the frame in the rear portion thereof in order to obtain the desired distribution of weight on all of the wheels of such vehicle. Once this has been accomplished, suitable holes are formed in the frame rails, and the rivets, such as the rivets 30, or other fasteners are used to secure the mounting flanges 22 to the frame rails 12.

Inasmuch as the balancing weights 22 are individually mounted, it will be readily apparent that they may be shifted as is necessary in mounting them in the vehicle frame, and the number of the balancing weights may be varied as desired in order to obtain the desired distribution of weight on vehicles of various models. By properly applying the balancing weights 22, the weight of the vehicle may be equally distributed upon the four wheels and the stability of the vehicle during driving operations will be greatly increased.

It is to be understood that whenever there is made reference to the weight of the vehicle 40, this weight is that of the vehicle 40 less driver and passengers.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claim.

What is claimed as new is as follows:

In a motor vehicle of the type including front and rear wheel assemblies and wherein the weight of the motor vehicle normally would be unequally distributed on said front and rear wheel assemblies being carried by said frame in frame supporting relation, said frame comprising a pair of transversely spaced, longitudinally extending frame rails, transverse frame members extending between and connecting together said frame rails to form a rigid structural unit, said rear wheel assembly including a transversely extending rear axle unit, said frame rails having upwardly bowed rear portions in the area of said rear wheel assembly to provide clearance for said rear axle units, said frame, in addition to the foregoing, having balancing weights, said balancing weights each being in the form of an elongated solid bar of heavy material and having mounting flanges fixed to opposite ends of said bar, said bars being disposed in spaced parallel relation and extending transversely of said frame between said upwardly bowed rear frame rail portions and forming part of and rigidifying said frame, at least said upwardly bowed rear frame rail portions being of opposed channel-shaped cross section, said mounting flanges being positioned within said frame rail portions and secured thereto, the position and weight of said balancing weights being such so as to change the weight distribution of the vehicle to equally distribute the weight of the vehicle on said front and rear wheel assemblies.

References Cited in the file of this patent

UNITED STATES PATENTS

| | | |
|---|---|---|
| 761,690 | Martell | June 7, 1904 |
| 1,700,477 | Goode | Jan. 29, 1929 |
| 1,704,843 | Smith | Mar. 12, 1929 |
| 1,903,968 | Hosmer | Apr. 18, 1933 |
| 2,701,144 | Kendzia | Feb. 1, 1955 |